United States Patent [19]

Fuss et al.

[11] Patent Number: 5,581,370
[45] Date of Patent: Dec. 3, 1996

[54] IMAGE-DEPENDENT AUTOMATIC AREA OF INTEREST ENHANCEMENT

[75] Inventors: William A. Fuss, Rochester; Reiner Eschbach, Webster, both of N.Y.

[73] Assignee: Xerox Corporation, Stamford, Conn.

[21] Appl. No.: 461,913

[22] Filed: Jun. 5, 1995

[51] Int. Cl.$^6$ .............................. H04N 1/40; G06K 9/40
[52] U.S. Cl. .................. 358/447; 358/445; 358/520; 382/254
[58] Field of Search .................... 358/447, 445, 358/451, 455, 500, 518, 520, 522; 382/254, 260, 261, 274; H04N 1/40

[56] References Cited

U.S. PATENT DOCUMENTS

| | | | |
|---|---|---|---|
| 5,247,352 | 9/1993 | Nagler et al. | 348/630 |
| 5,285,220 | 2/1994 | Suzuki et al. | 358/518 |
| 5,347,374 | 9/1994 | Fuss et al. | 358/522 |
| 5,357,352 | 10/1994 | Eschbach | 358/518 |
| 5,363,209 | 11/1994 | Eschbach et al. | 358/445 |
| 5,371,615 | 12/1994 | Eschbach | 358/515 |
| 5,414,538 | 5/1995 | Eschbach | 358/522 |

OTHER PUBLICATIONS

R. C. Gonzales and B. A. Fittes, "Gray level transformation for interactive image enhancement," Proc. Second Conference on Remotely Manned Systems, 1975.

E. L. Hall, "Almost uniform distributions for computer image enhancement," IEEE Trans. Comput. C-23, 207-208, 1974.

W. K. Pratt, *Digital Image Processing*, Wiley, New York, 1978.

M. P. Ekstrom, *Digital Image Processing Techniques*, Academic Press, Orlando, 1984 (J. S. Lim).

J. C. Russ, *The Image Processing Handbook,* CRC Press Boca Raton, 1992.

Pizer et al. "Adaptive Histogram Equalization and its Variations", Computer Vision, Graphics, and Image Processing, 39, 355–368 (1987), pp. 355–369.

R. C. Gonzalez and P. Wintz, "Image Enhancement by Histogram Modification Techniques", *Digital Image Processing*, Addison–Wesley Publishing, 1977, p. 118 et seq.

"Xerox Color Encoding Standard," XNSS 289005, 1989.

Primary Examiner—Edward L. Coles, Sr.
Assistant Examiner—Madeleine A. Nguyen
Attorney, Agent, or Firm—Mark Costello

[57] ABSTRACT

A method of improving the contrast in a natural scene image. A relevant histogram of the image is derived for from a selected subset of local histograms representing regions of the image. The signal describing the histogram is operated on with a filter having the characteristic of weakening strong peaks and valleys in the function, but not effecting flat portions of the signal. The filtered histogram signal is used for controlling the TRC mapping in a device at which the image is to be printed. To assure optimum selection of local histograms, regions including the black point and white point of an image are determined and added to the subset of local histograms representing regions of the image.

13 Claims, 16 Drawing Sheets

IMAGE-DEPENDENT AUTOMATIC AREA OF INTEREST ENHANCEMENT

The present invention is directed toward a method and apparatus for improving the appearance of a digital image having a natural scene pictorial image, and more particularly, toward a method for improving the contrast within such an image.

CROSS REFERENCE

Cross reference is made to the following co-pending patent applications assigned to the same assignee as the present application: U.S. patent application Ser. No. 08/247,367 entitled "Image-Dependent Color Saturation Correction in a Natural Scene Pictorial Image", filed May 23, 1994 by R. Eschbach; and U.S. patent application Ser. No. 08/133,231 entitled "Image-Dependent Luminance Enhancement", filed Oct. 7, 1993 by R. Eschbach.

INCORPORATION BY REFERENCE

The following patents are incorporated by reference for their teachings of natural scene image enhancement: U.S. Pat. No. 5,363,209 to Eschbach; U.S. Pat. No. 5,357,352 to Eschbach; U.S. Pat. No. 5,347,374 to Fuss et al.; U.S. Pat. No. 5,371,615 to Eschbach; and U.S. Pat. No. 5,414,538 to Eschbach.

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality. One very common set of input documents includes photographs. Unfortunately, photography is an inexact science, particularly among amateurs, and original photographs are often poor. Alternately, technology, age or image degradation variations often result in pictures having an unsatisfactory and undesirable appearance. What is desired then, is a copy giving the best possible picture, and not a copy of the original.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

Three possible choices are presented by the art in the area of image enhancement. In the first case, we can do nothing. Such a system is a stable system, in that it does no harm to an image. This is a common approach taken to reproduction. However, the output documents of such a system are sometimes not satisfactory to the ultimate customer.

In a second case of image enhancement, the image can always be processed. It turns out that an improvement can usually be made to an image if certain assumptions are made that are accurate for most cases. In an exceptionally large set of images, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further, the process may undesirably operate on those images which are good ones.

Accordingly, we arrive at our third case of image enhancement, a process of automated image enhancement which operates to vary images which are not perceived as good images, but does not operate on images which do not need to be improved.

Many improvements can be made to an image, including exposure adjustment (described in U.S. Pat. No. 5,414,538), color balance correction (described in U.S. Pat. No. 5,357,352 and U.S. Pat. No. 5,371,615) or contrast enhancement (described in previously filed U.S. patent application Ser. No. 08/133,231, filed Oct. 7, 1993). Generally, these processing methods operate by modifying a set of tone reproduction curves (TRCs). The output image is achieved by using TRC curves, operating either on the luminance channel of an image expressed in $LC_1C_2$ coordinates, or preferably on each channel in a color density space description of the image in Red-Green-Blue (rgb) coordinates.

One particular improvement that can be made to an image is enhancement of contrast. Contrast refers to the perception of the dynamic range of the image, or the range of densities within the possible densities at which the image is defined. Empirically, preferred images are relatively high in contrast, i.e., the image makes use of the entire dynamic range that is possible. The dynamic range of an image can be empirically measured by performing a histogram on the image, which determines how many pixels within the image have a particular intensity within the range of possible intensities. Preferred images tended to be characterized by histograms indicating that the entire dynamic range of the image is used. Algorithms exist that modify an image in a way as to generate a histogram that covers the entire dynamic range. The most common algorithm is the histogram flattening/histogram equalization algorithm as described in R. C. Gonzales and B. A. Fittes, "Gray level transformation for interactive image enhancement," Proc. Second Conference on Remotely Manned Systems 1975; F. L. Hall, "Almost uniform distributions for computer image enhancement," IEEE Trans. Comput. C-23, 207–208, 1974; W. K. Pratt, *Digital Image Processing*, Wiley, New York, 1978; M. P. Ekstrom, *Digital Image Processing Techniques*, Academic Press, Orlando, 1984; and J. C. Russ, *The Image Processing Handbook*, CRC Press, Boca Raton, 1992. However, when a histogram is globally flat, undesirable image artifacts are noted in a large number of cases where the application was to produce a visually pleasing image. Histogram equalization techniques perform well in cases where the application requires the detection of features in an image, as in medical or remote sensing applications. Modifications to the histogram equalization techniques are known as adaptive histogram equalization (AHE) as in S. M. Pizer et al., "Adaptive histogram equalization and its variations," Comput. Vision graphics and Image Proc. 39, 355–368, 1987 and the citations thereof. AHE again tends to work well when the aesthetic appearance of the image is not critical, but the information content of the image (that is, i.e. how well details are visible) is critical. When these goals and assumptions are not in place, histogram flattening and its known modifications work poorly.

Also noted is R. C. Gonzalez and P. Wintz, "Image Enhancement by Histogram Modification Techniques", *Digital Image Processing*, Addison-Wesley Publishing, 1977, p. 118 et seq., describing histogram flattening functions known in the art.

U.S. patent application Ser. No. 08/133,231 entitled "Image-Dependent Luminance Enhancement" filed Oct. 7, 1993 by R. Eschbach et. al., teaches a method of improving the contrast in a natural scene image, in which the image is converted from an original set of color coordinates to an expression where one term has a relationship to overall image intensity or density. A global histogram of the image is derived for that term, which plots the populations of pixels at each possible level of density in the image. That histogram is operated on with a filter having the characteristic of weakening strong peaks and valleys in the function, but not effecting flat portions of the histogram. The filtered histogram signal is used for controlling the TRC mapping in a device at which the image is to be output. Contrast is estimated in areas likely to have the most image information, using the method described above, and further, dividing the image into a number of segments, each describable by a local histogram signal for that image segment. Each local histogram signal is compared to the global histogram, to determine local image variations. From the comparison of the local histograms with the global histogram, a relevant histogram signal is derived and directed to the histogram filter in its place. The TRC derived from the relevant image histogram is applied to the color channels of the image.

A problem arises in the circumstance where the thusly determined region of interest does not provide sufficient information needed to improve image appearance.

The references cited are herein incorporated by reference.

SUMMARY OF THE INVENTION

In accordance with the invention, there is provided a method of improving the contrast in a natural scene image.

In accordance with one aspect of the invention, contrast in a natural scene image can be improved by a) developing a histogram representing critical areas of the image, where the critical areas include both areas having represented therein a significant portion of the dynamic range of the image and the areas in which the black point of the image and the white point of the image occur; b) filtering the histogram with a filter to reduce strong peaks and valleys in the image; and c) developing a tone reproduction curve for the image mapping input signals to output signals based on the filtered histogram.

In accordance with one aspect of the invention, there is provided a method of improving the contrast in a natural scene image recorded as a set of electronic signals, including the steps of:

assuring that at least one component of the original electronic signal forming the natural scene image is defined with a signal describing intensity of the image;

from the intensity component of the electronic signals, deriving a set of local histograms signals, each describing the population of signals at each possible intensity level within the image for a region of the image;

selecting a subset of the local histogram signals as representing a maximum dynamic range of the natural scene image;

determining locations, by region, of the black point and white point within the electronic signals of the image;

assuring that the histograms representing regions in which the black point and white point occur are members of the subset of local histogram signals, and if not, adding them thereto;

combining the subset of local histograms with a selected weighting function to generate a relevant histogram;

operating on the relevant histogram signal with a filter that has the characteristics of reducing strong peaks and valleys in the signal;

using the filtered histogram signal, deriving a tonal mapping of input signals to output driver signals;

for each electronic signal forming the natural scene image, mapping the electronic signal to an output driver signal, using the tonal mapping derived.

In certain circumstances, the region of interest does not provide sufficient information to improve image contrast if it is designated solely by reference to dynamic range. Accordingly, it has been discovered, that in systems where the black point and white point of an image are determined, such values may be used to enhance contrast.

Within an automated image enhancement system, data exists as a shared context between several image analyzers. Each analyzer performs necessary steps and stores analytical data which can be dynamically accessed though shared context. In the case of performing automatic processing using selected regions of interest (ROI), a single histogram of the relevant image parts is created as the weighted sum of the selected histograms, as in U.S. patent application Ser. No. 08/133,231 entitled "Image-Dependent Luminance Enhancement" filed Oct. 7, 1993 by R. Eschbach et. al. The weighting coefficients used in these examples were identical for all selected local histograms. The resultant histogram is then used to determine a TRC for image enhancement using a modified histogram flattening algorithm applied to the entire image.

These and other aspects of the invention will become apparent from the following descriptions used to illustrate the preferred embodiment of the invention, read in conjunction with the accompanying drawings in which.

Figure 2:
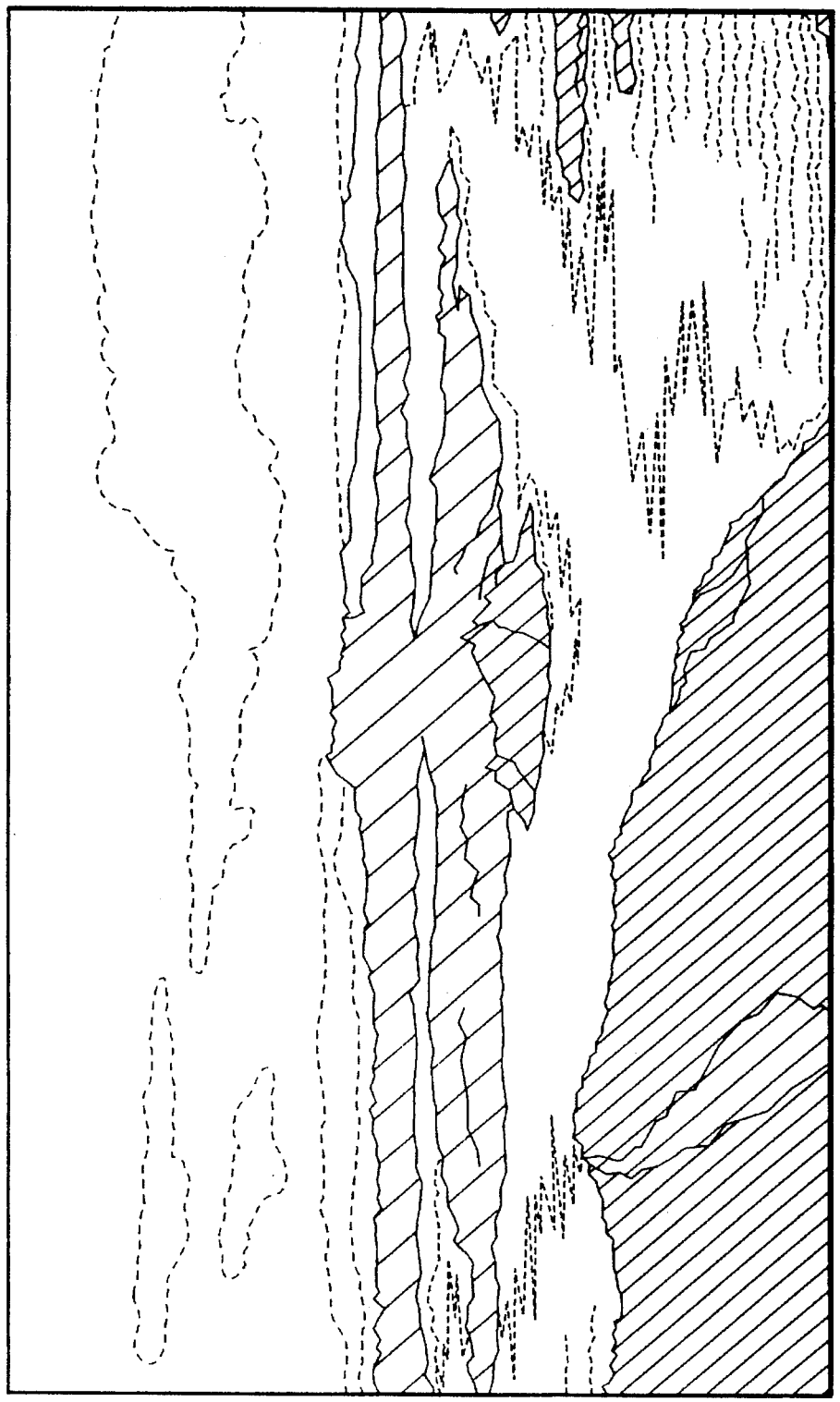
FIG. 2 shows an example image which for reproduction purposes has been reduced to a line image.
Figure 5A:
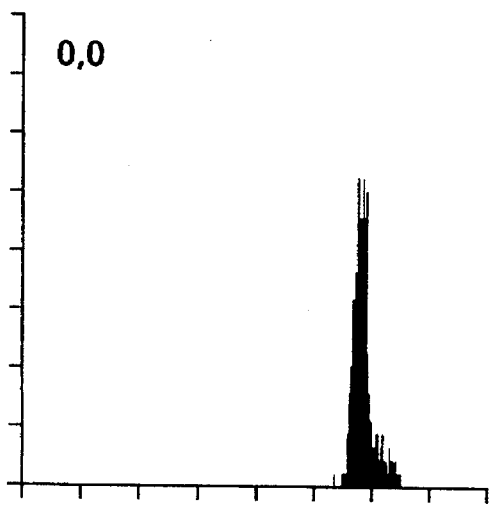
Figure 5B:
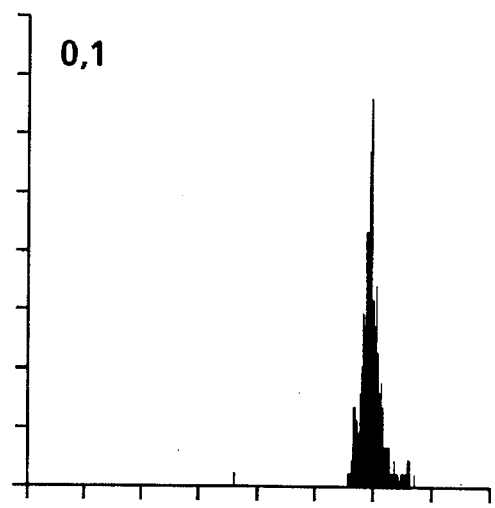
Figure 5C:
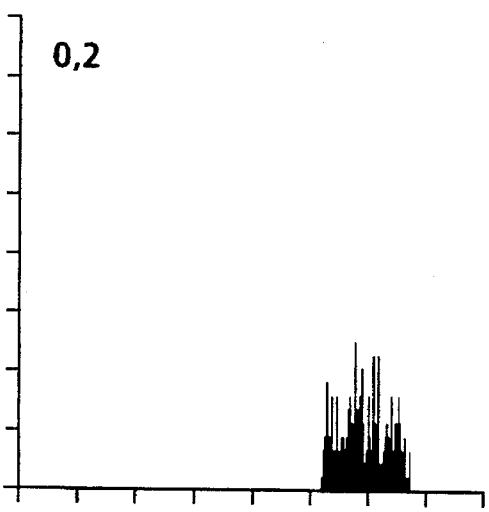
Figure 5D:
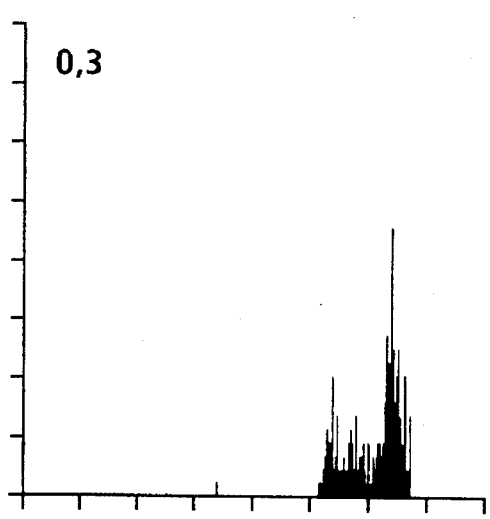
Figure 9:
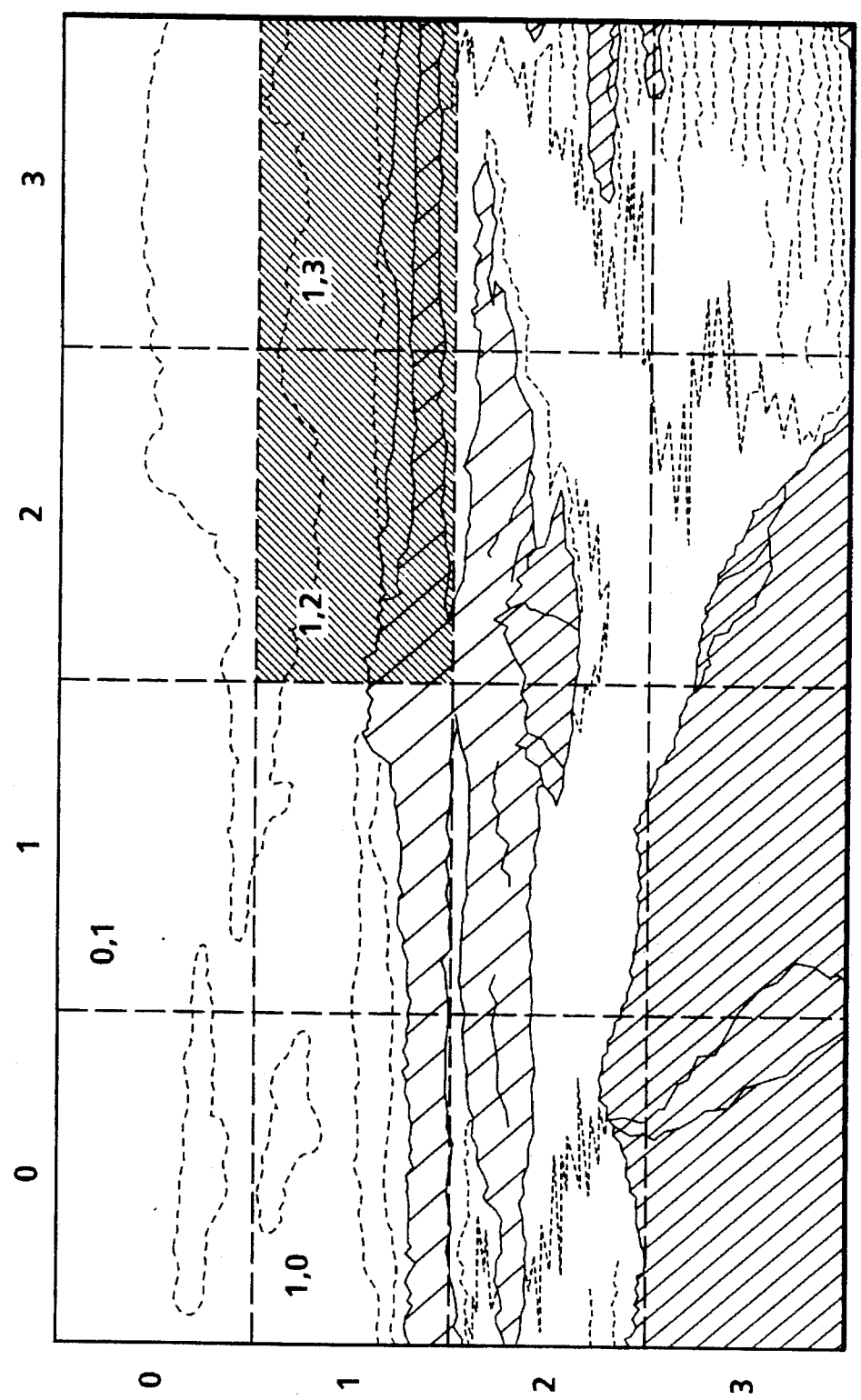
Figure 10:
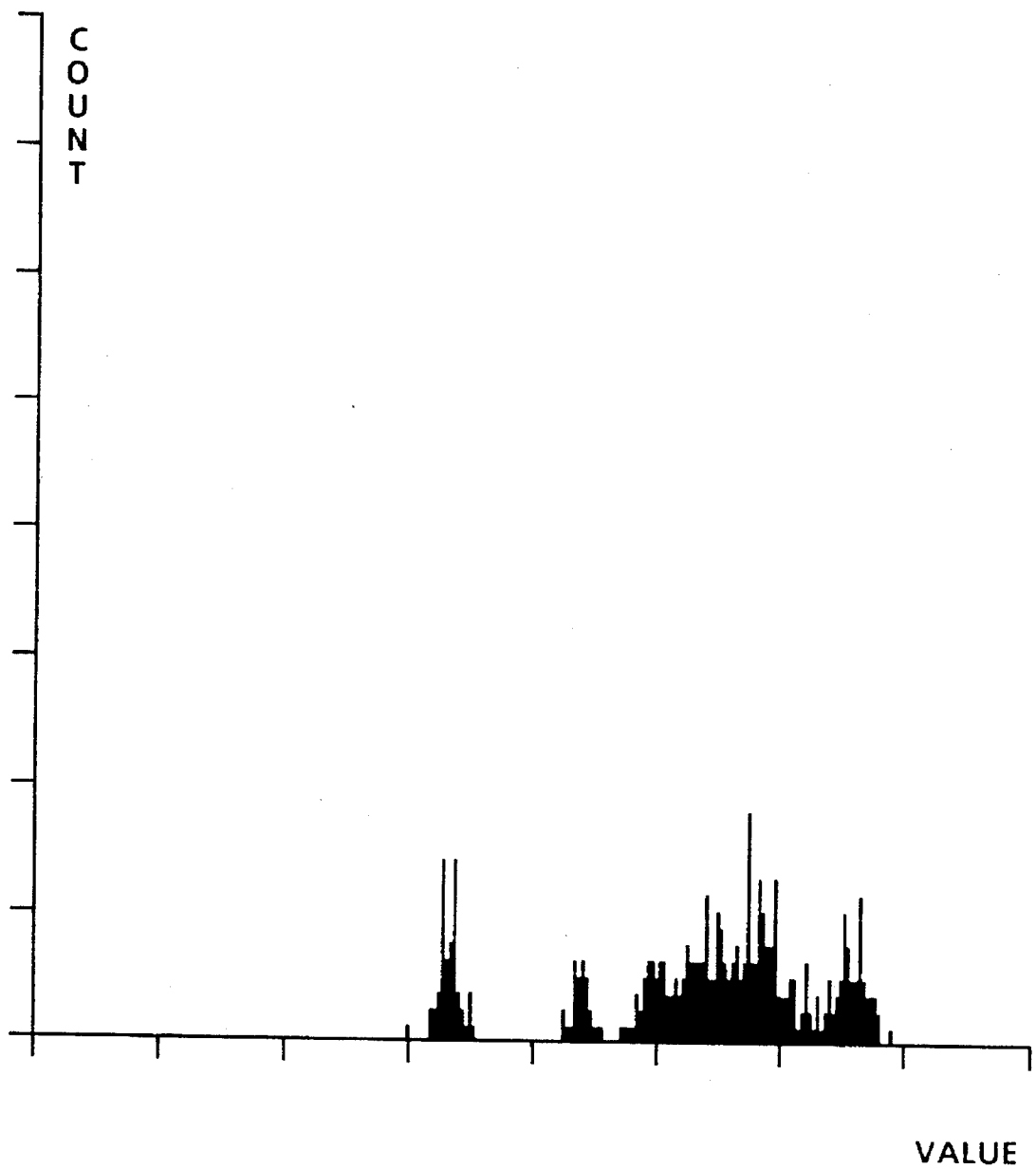
Figure 11:
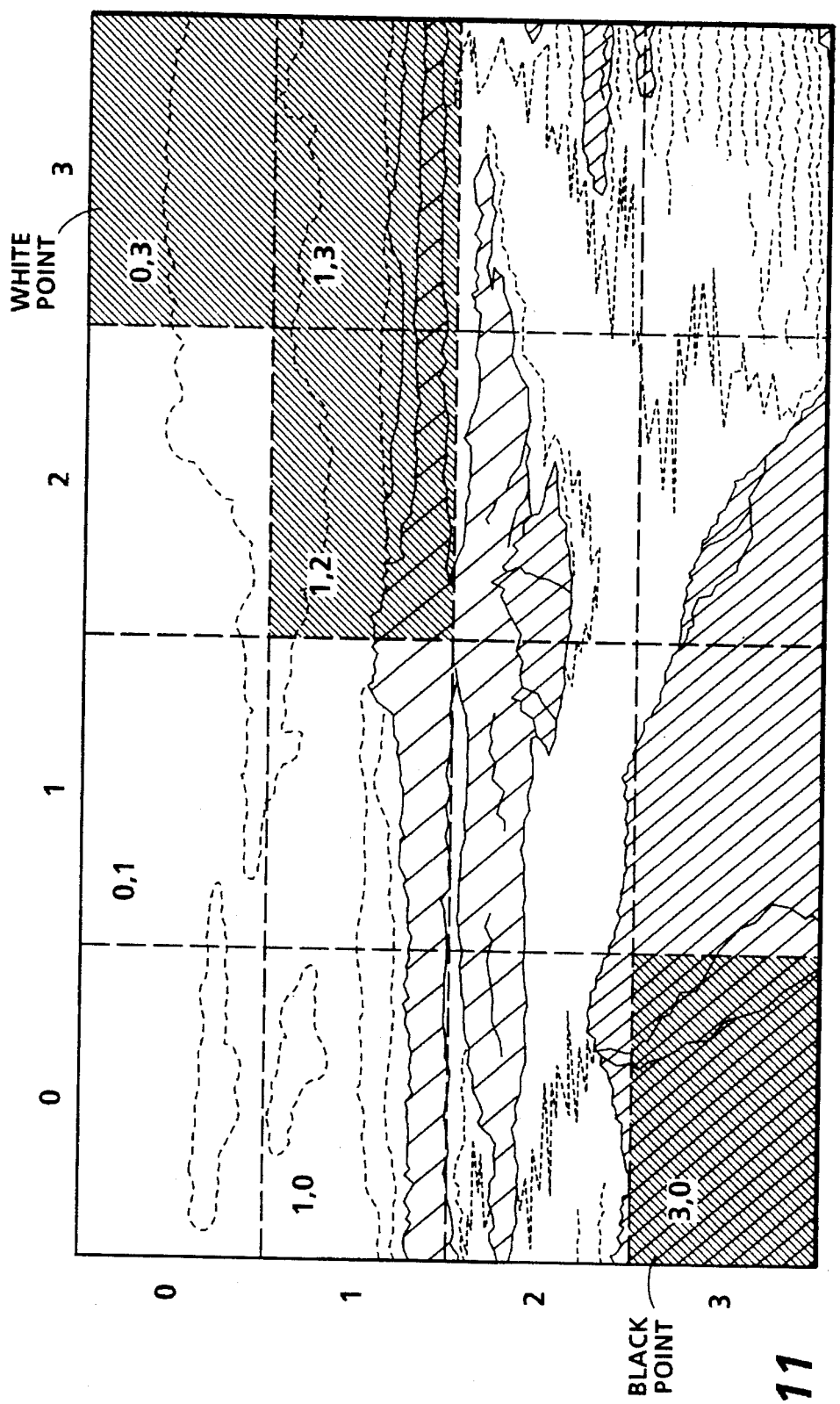
Figure 12:
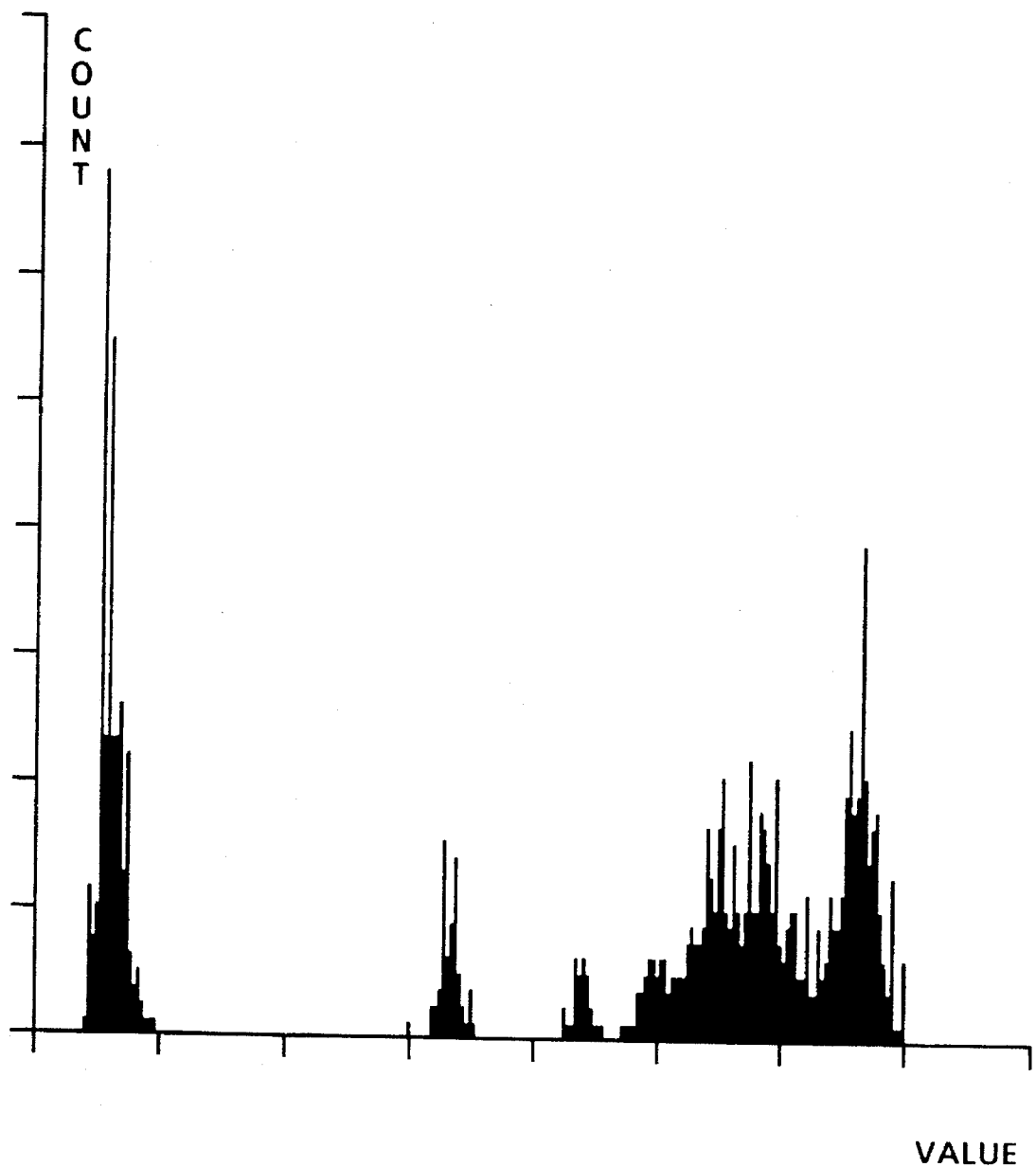
Figure 13:
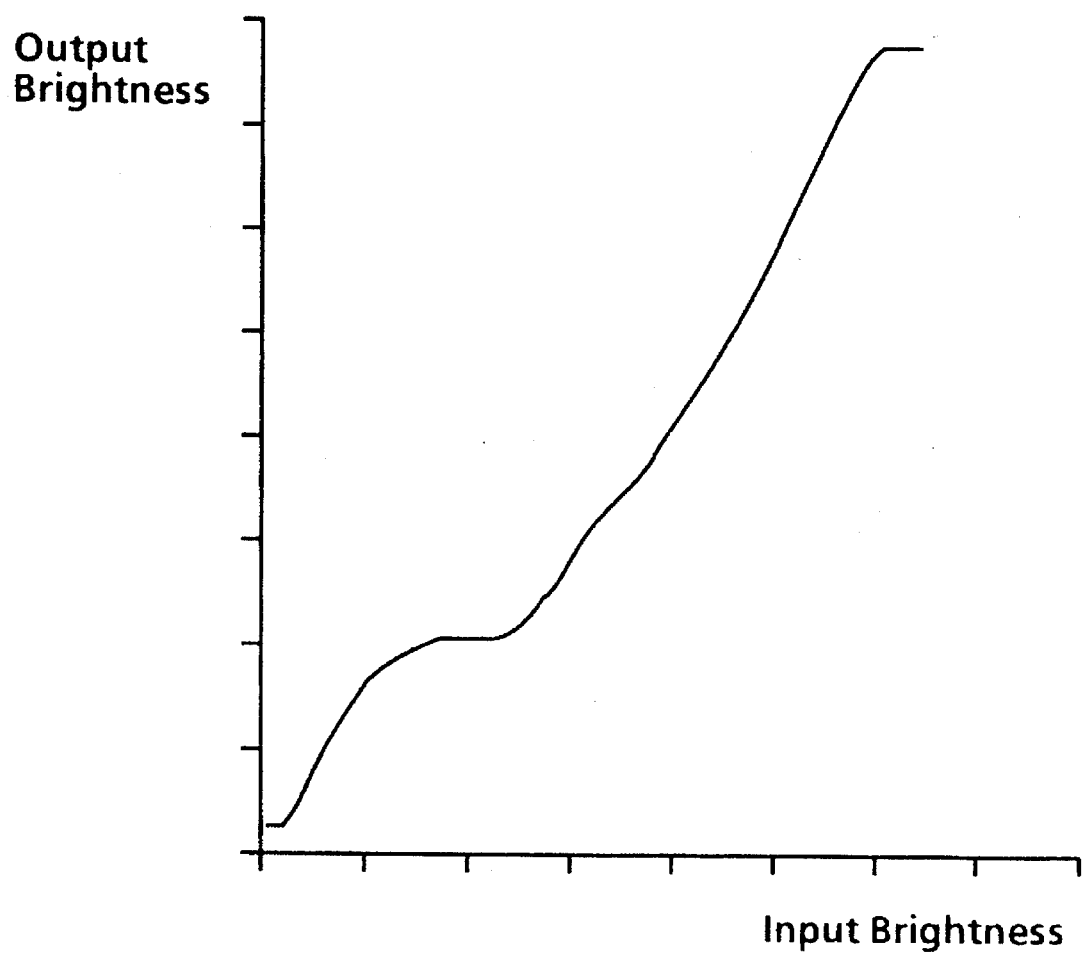
Figure 14:
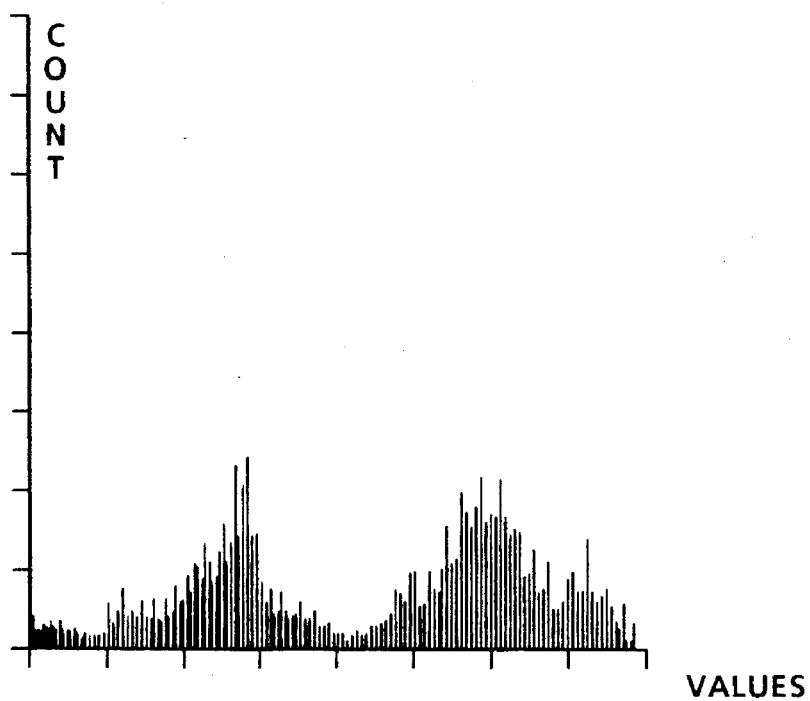
Figure 15:
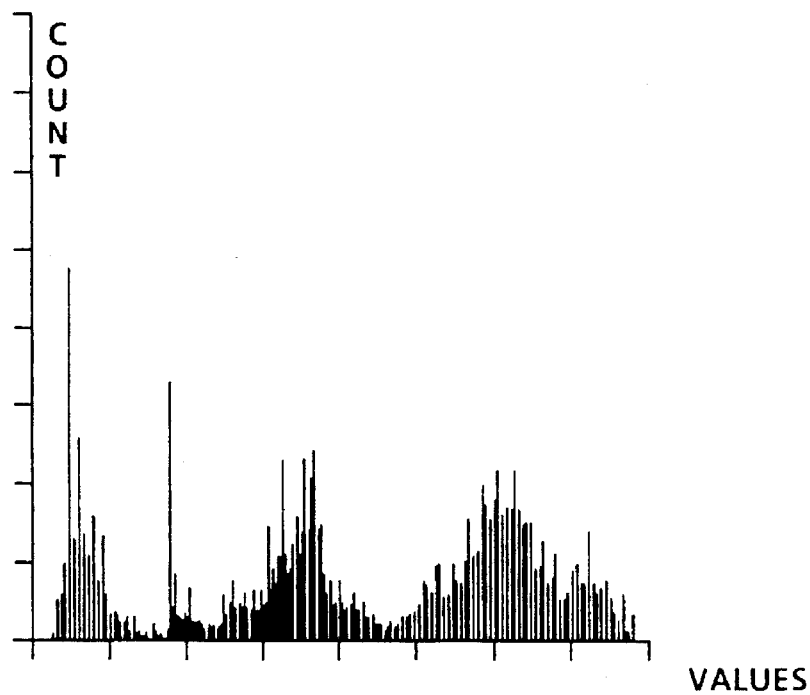
Figure 16:
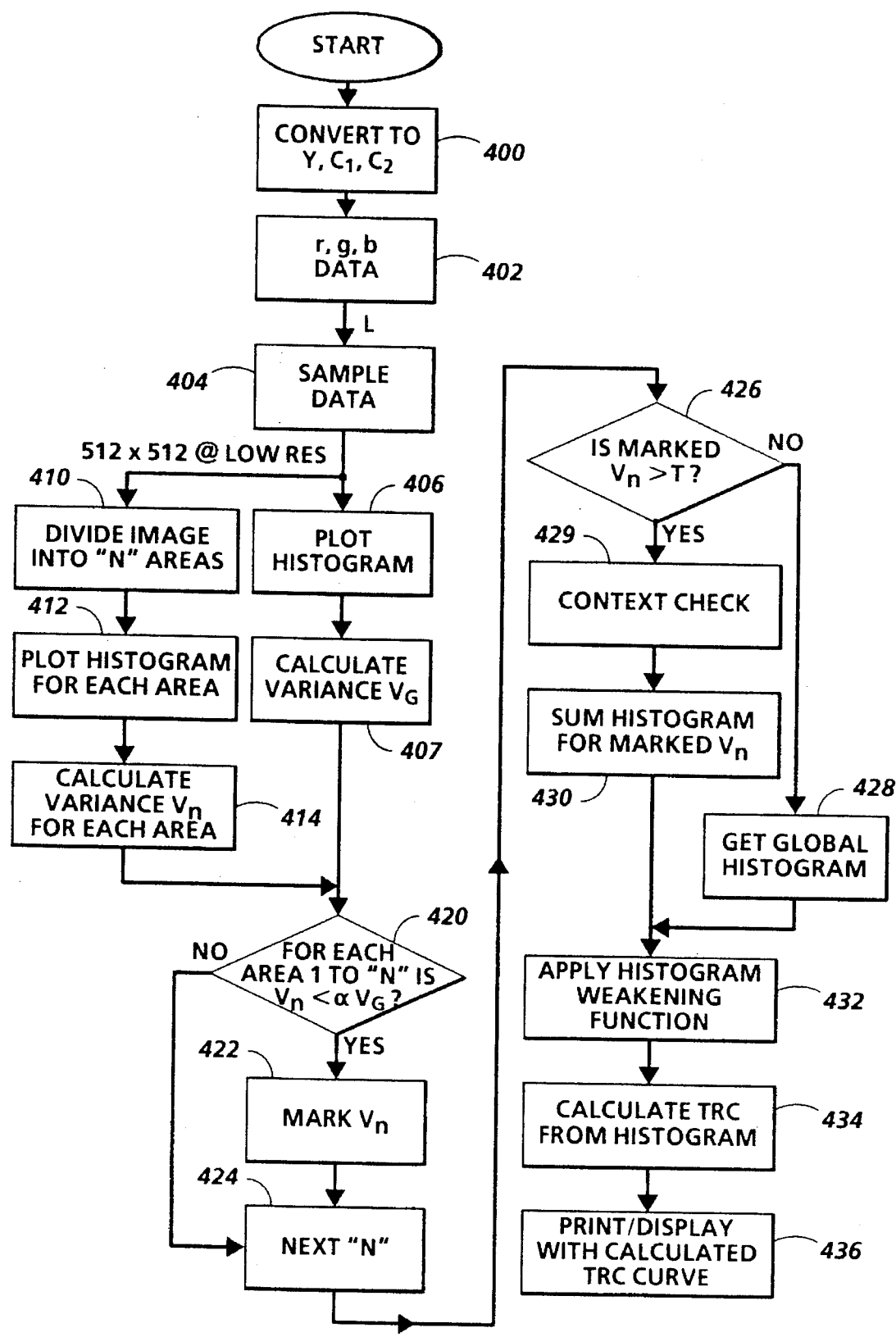
Figure 17:
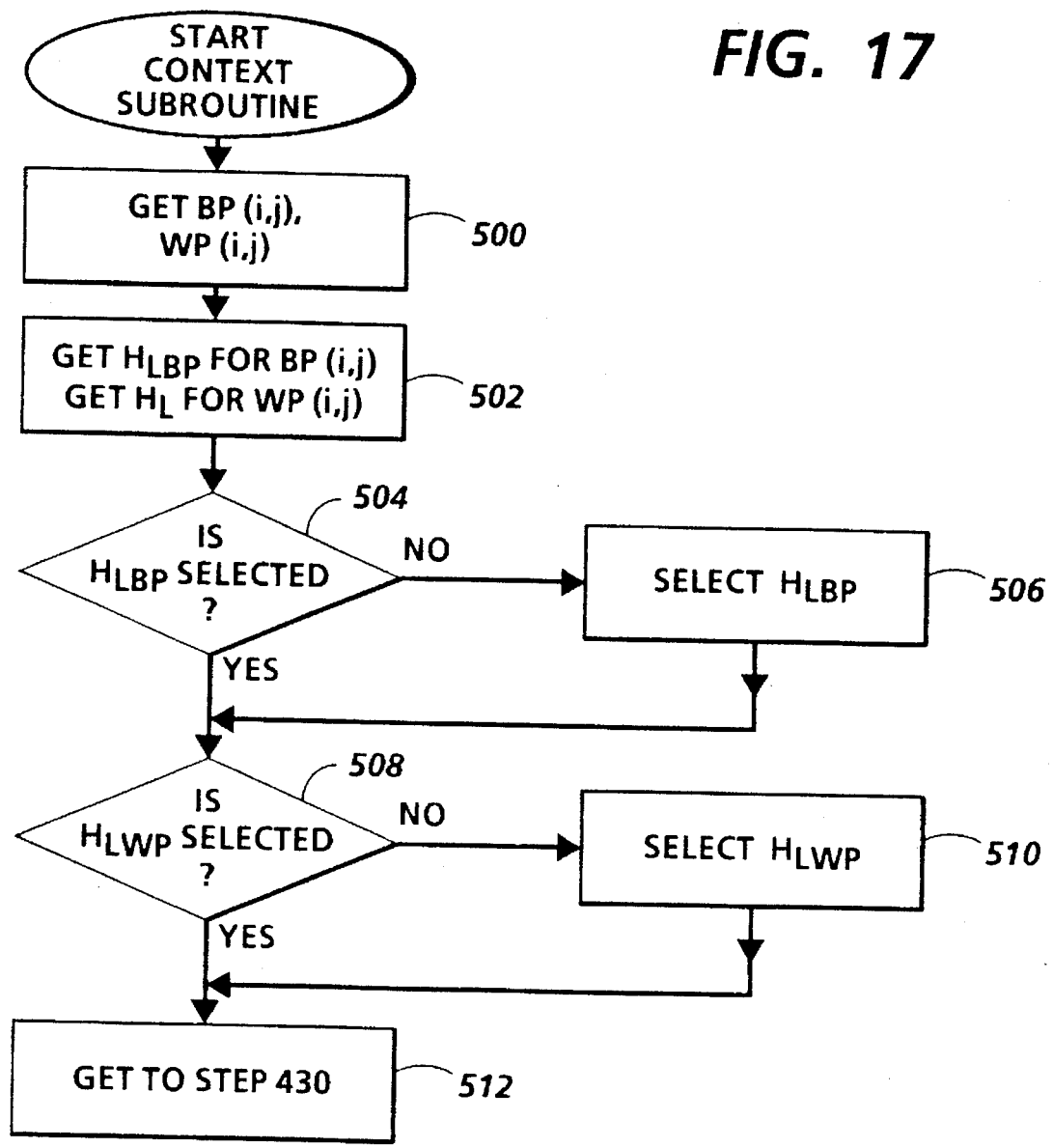

FIGS. 5A, B, C, D–8A, B, C, D show the histograms for each sub image of FIG. 2;

FIG. 9 shows the initial choice of local regions whose histograms form the relevant histogram of the image;

FIG. 10 shows the relevant histogram for FIG. 9;

FIG. 11 shows the altered choice of local regions whose histograms form the altered relevant histogram for the image;

FIG. 12 shows the relevant histogram of FIG. 11;

FIG. 13 shows the TRC curve derived for reproduction of the image;

FIG. 14 shows the image histogram after processing the image using the local regions in FIG. 9;

FIG. 15 shows the image histogram after processing using the local regions of FIG. 11; and FIGS. 16 and 17 together show a flow chart of the inventive process.

DETAILED DESCRIPTION OF THE INVENTION

Figure 1:
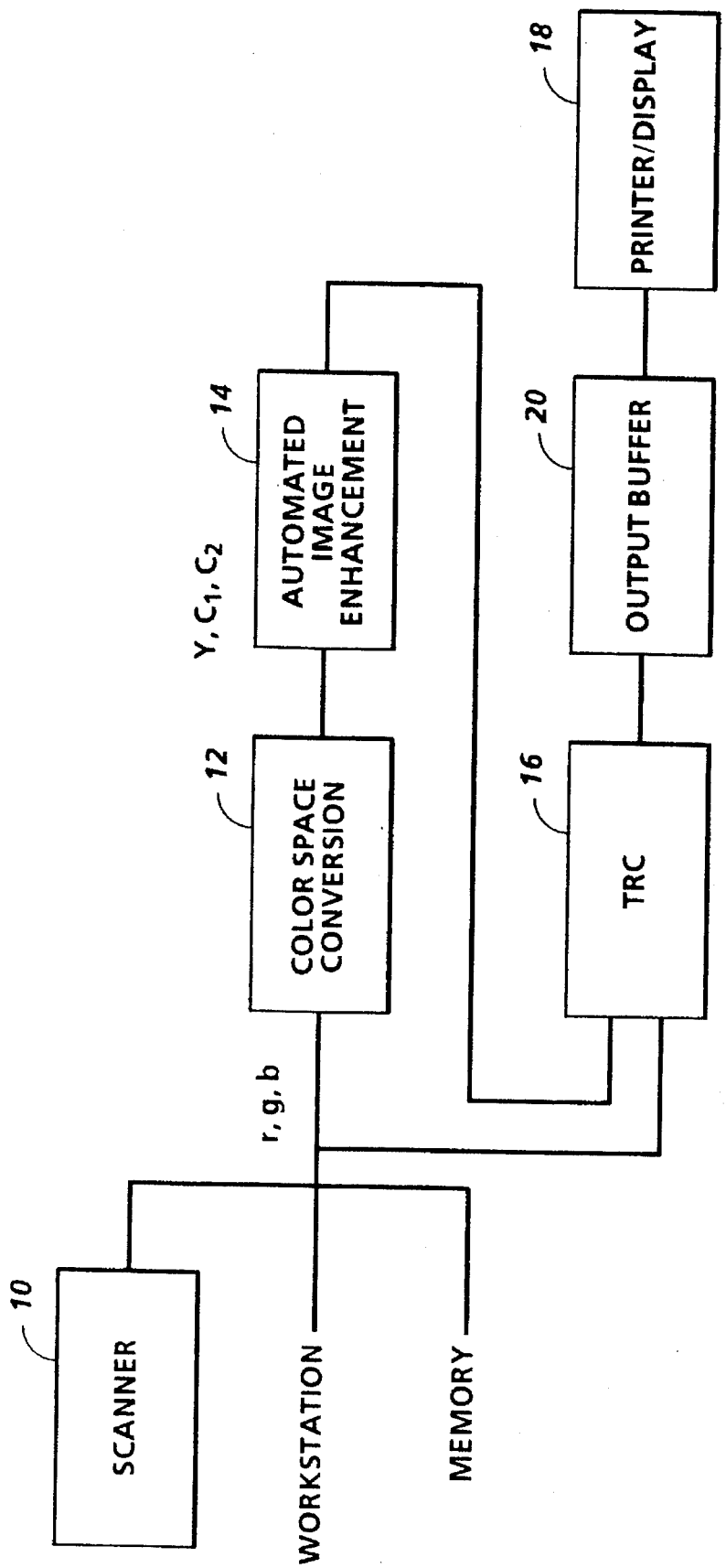
FIG. 1 shows a block diagram of a system employing the present invention.

Referring now to the drawings where the showings are for the purpose of describing the embodiment of the invention and not for limiting same, reference is made to FIG. 1 scan-to-print system in which the present invention may find advantageous use.

FIG. 1 illustrates a scanner 10 which may conveniently be a black and white or color scanner which produces image signals defined in either RGB space for color images or density space for black and white images. These images of concern are pictorial in nature, i.e., they represent natural scenes. While certain computer generated imagery may qualify as representing nature scenes, the contemplated images are predominantly scanned photographs. The images themselves are defined in terms of pixels, wherein each pixel has a gray value which varies between a white level and a black level. In a currently desirable system, in which calculations may be done on 8 bits of information, 256 levels of gray will be available for use. Pixels are also identified in terms of position, i.e, a pixel defines a unique area within the image, identified by its position in a scan line, and the scan line position in a page. Color is therefore represented by triplets of gray pixels for each color pixel in the image, each triplet of gray pixel defining the color in each separation, which together form the color pixel.

The output of a scanner 10 may be directed to an automated image enhancement system which will be further defined herein. For our purposes, the automated image enhancement system may include a segmentation system which can identify within a document a type of image, including pictorial and non-pictorial image areas. It will be assumed that the output of the automated image enhancement system that is described herein will be directed to a printer, CRT, or like device. These devices may have many characteristics and may be laser printers, or ink jet printers or LED displays or CRT displays. However, they have as a common requirement the representation of gray pictorial images. This may be done with gray printing or pseudo gray printing.

In terms of deriving data for operation by the present image enhancement system, a prescan may be performed on a document placed on a copying platen and scanned by the electro-optical system of the scanner to produce a signal representing the document image. Alternatively, the image may be directed to the automated image enhancement system from a memory, having previously been scanned or derived some other system, in which case, the received image is sampled as required. It will no doubt be appreciated that the automated image enhancement system could be accomplished on a personal computer or workstation, appropriately programmed to operate in accordance with the method to be described.

The prescan is undersampled, i.e., the image need not be sampled at the ultimate resolution of the system for the purposes of contrast enhancement. In practice, it has been determined that a relatively small number of pixels representative of and dispersed through the entire image can accurately represent the image for this purpose. In our particular embodiment, we use a block of pixels derived from the image in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Hardware embodiments of the described inventive process might decide not to undersample the image.

Generally, the system in which the present invention finds use can be represented as in FIG. 1, wherein natural scene images defined in terms of RGB space are initially directed to a color space converter 12, which converts RGB values to a selected color space for enhancement processing, as will become apparent. The output of color space converter 12 is processed by the automated image enhancement device 14 as will be described in more detail, which produces a signal that drives the TRC controller 16 of an output device such as printer 18. TRC controller 16 transmits the processed data to an optional output buffer 20, for subsequent transfer to printer 18 or other output device. The implementation of the present invention alters the TRC on an image by image basis, as will be more completely described hereinafter. It will be clear that the TRC controller 16 might work separately or integrally with the TRC controller that is commonly used to adjust the device independent data stream to the device dependent data used for printing or display.

Now looking at each process step of the implemented automated image enhancement device, for the first step, the initial color image data initially received from scanner 10 or the like, is assumed to be in RGB space initially, i.e., red—green—blue space, and for the inventive process, must initially be converted at color space converter 12 to luminance space ($YC_1C_2$). It is possible that the image will already be in luminance space, as it is common to convert RGB values to luminance/chrominance space for other image processing. $YC_1C_2$ space is a useful space in which the inventive process can be performed, and Xerox YES space is one possible embodiment of such a space. Whatever space is used must have a component which relates to the human visual perception of lightness or darkness, such as Y of Xerox YES of the "Xerox Color Encoding Standard," XNSS 289005, 1989. In the following, the invention will be described using the Xerox YES color space.

For the description of the remainder of the process of the invention, reference is made to the image of FIG. 2. FIG. 2 is a black and white line drawing reproduction of an actual color image with 8 bit gray pixels. While reproduction difficulties require the original image to be represented by a line drawing for the purposes of this application, the data shown in the following figures is for the actual image.

Figure 3:
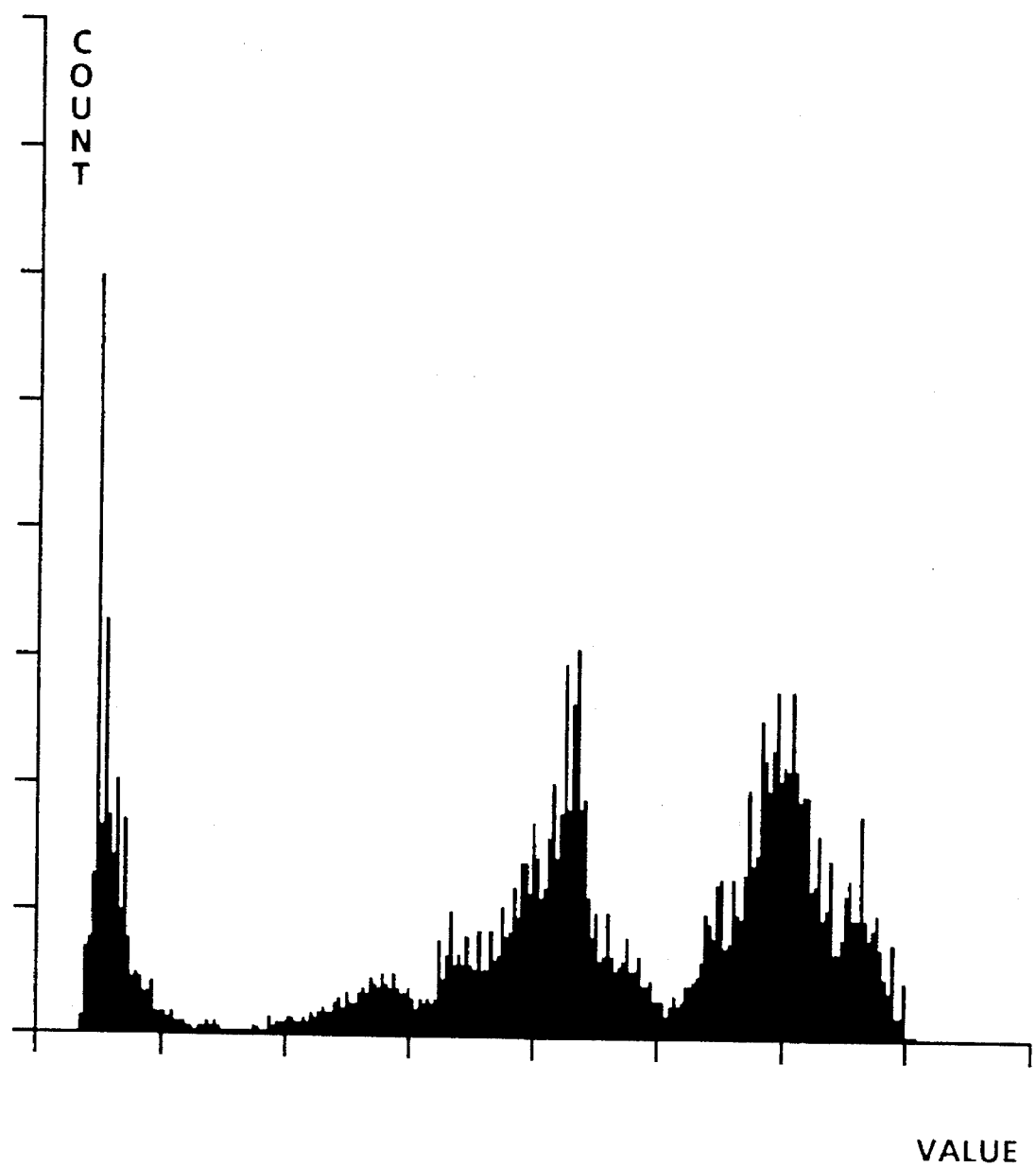
FIG. 3 shows the histogram derived for FIG. 2.

The next step, now accomplished within the automated image enhancement device 14, is to measure the image in terms of some system parameter. In the present embodiment, a global histogram of the luminance or Y-component of the pictorial image will be derived. The histogram shown in FIG. 3 is a map of populations of pixels at each luminance value possible in the image. The global histogram refers to the entire image of FIG. 2. If operating in a multi-bit space, such as 8-bit space, we will find that the luminance values will be distributed between 0 and 255.

Figure 4:
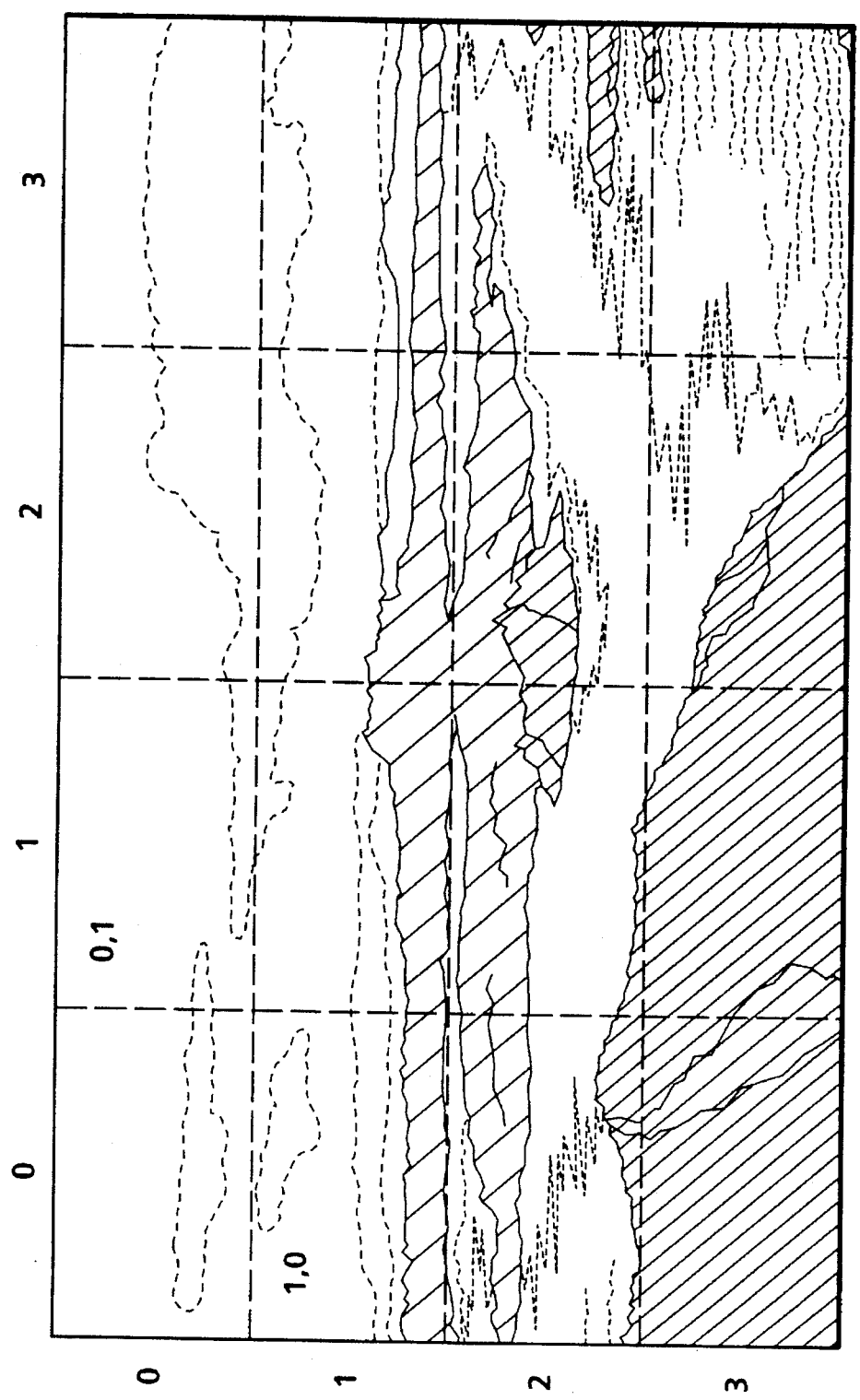
FIG. 4 shows the example image of FIG. 2 divided into a plurality of sub images.

Next, in addition to the global histogram of the entire image, and with reference to FIG. 4, the image is divided into a set of local areas, not necessarily identical in size, or ordered in any fashion, and histograms from each local area are derived. It has been determined that multiple local histograms are desirable for processing. Local area histograms are derived because visual contrast is not a global phenomena and therefore needs local measures as well as global measures. That is to say, both local and global parameters of an image influence the general perception of contrast. Also, in a large number of images, locality gives some indication of the relative importance of image parts. Additionally, it has been noted that large background areas, which are irrelevant to contrast adjustment tend to skew the global histogram in a manner that makes contrast adjustment difficult. The influence of these large background areas can be reduced using local histograms in addition to the global histogram.

The next step in the enhancement process compares the global histogram to a reference, in the example a flat histogram. A flat histogram, as defined herein, is a reference signal which provides a uniform number of pixel counts for each density or luminance possible within the image. The global histogram is compared to this flat histogram to give a global measure of contrast in the form of a variance. Variance V is represented by the equation:

$$V = c \times \sum_{i}^{n} [H(i) - R(i)]^2$$

where
"c" is a renormalization constant
where
H(i) represents the histogram function of the image in consideration;
R(i) represents the flat histogram or reference value; and
i represents the particular 2-dimensional pixel position in the image having n pixels.

Generally speaking, with reference to the variance, the smaller the value, the flatter the histogram. It will no doubt be appreciated that the flat histogram signal may be constructed so that is not "flat", but rather represents a desirable reference.

Figure 6A:
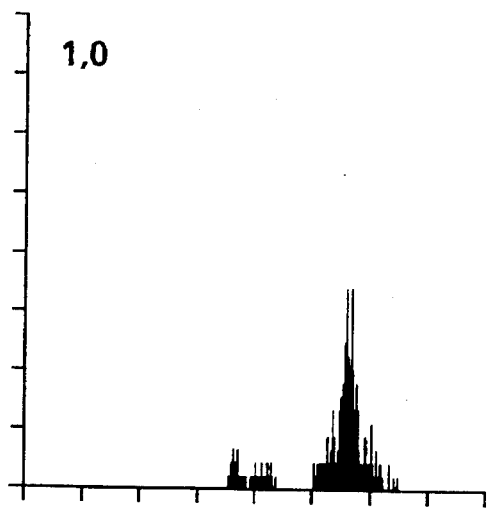
Figure 6B:
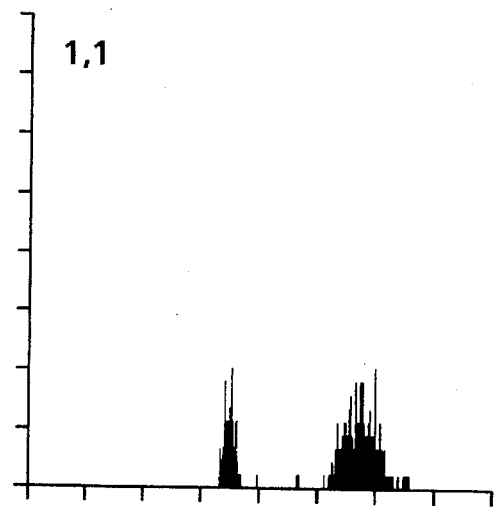
Figure 6C:
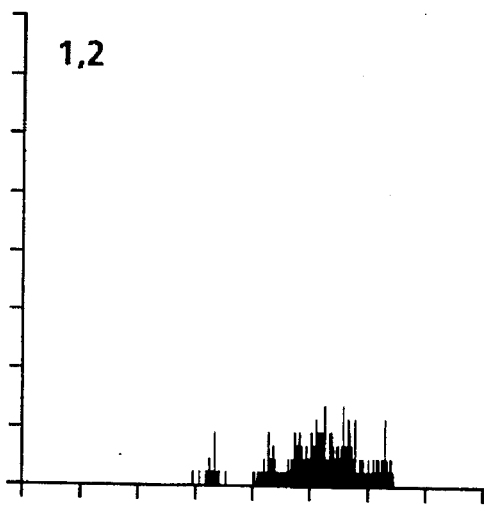
Figure 6D:
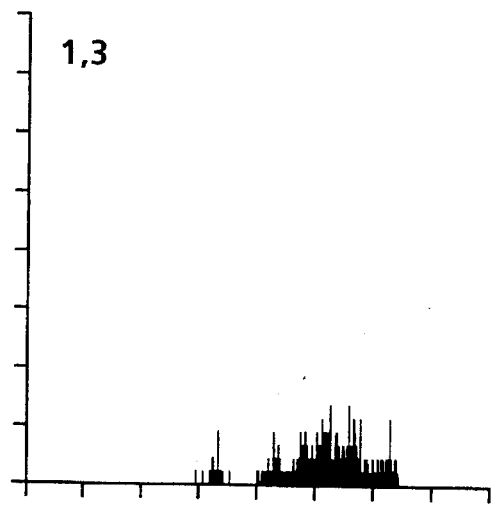
Figure 7A:
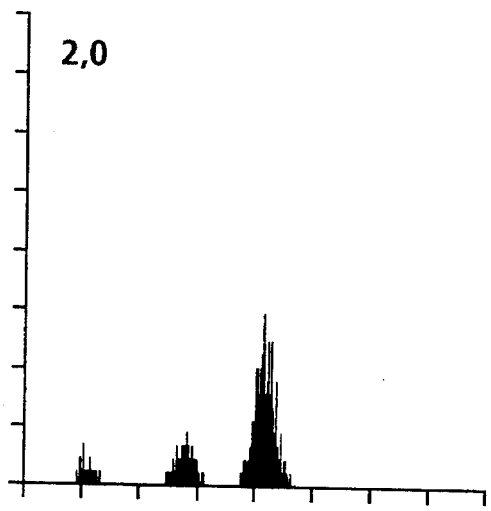
Figure 7B:
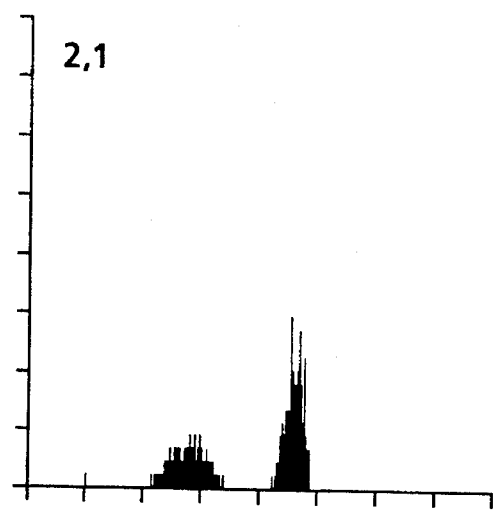
Figure 7C:
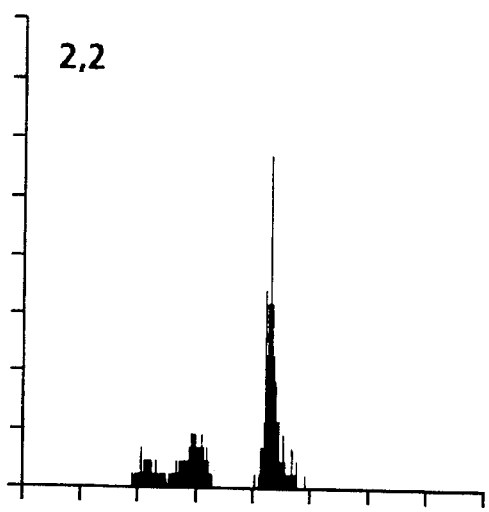
Figure 7D:
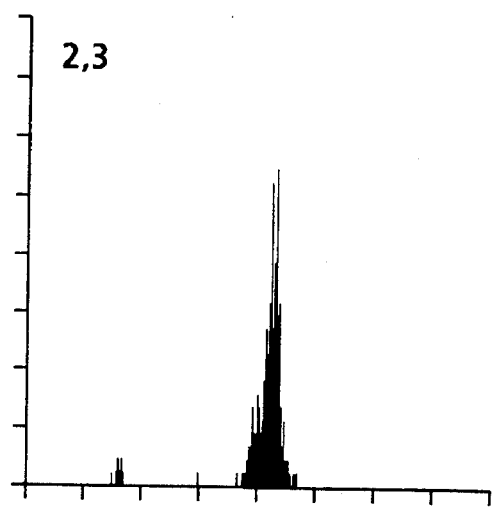
Figure 8A:
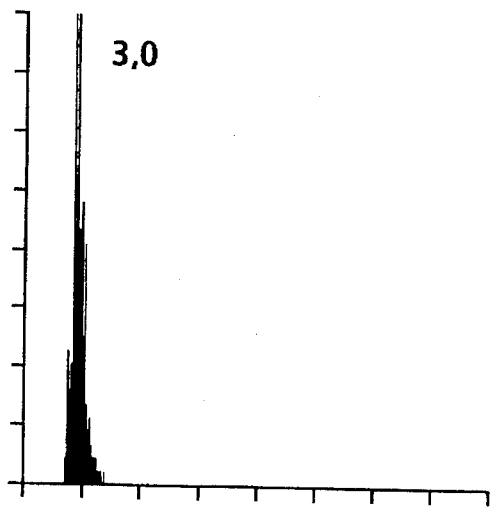
Figure 8B:
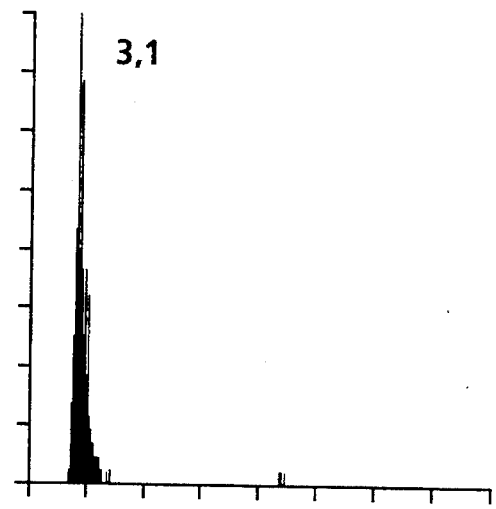
Figure 8C:
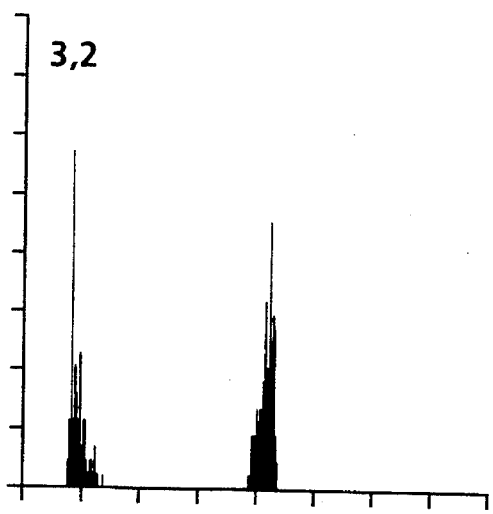
Figure 8D:
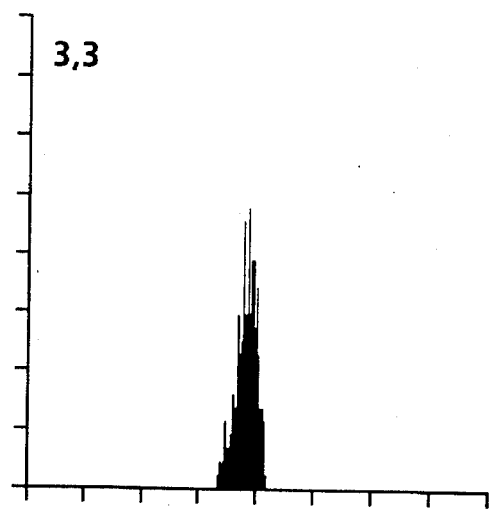

FIGS. 5A, B, C, D–8A, B, C, D, show the local histograms using the local histogram layout of FIG. 4, with FIG. 5A, B, C, D showing the first row of histograms, FIG. 6A, B, C, D, the second, FIG. 7A, B, C, D, the third, and FIG. 8A, B, C, D, the fourth row. A variance value in AU (arbitrary units, where only the relation to the other numbers is of importance) is also determined for each of the local histograms, which correspond to image segments:

TABLE 1

|   | 0   | 1   | 2   | 3   |
|---|-----|-----|-----|-----|
| 0 | 188 | 181 | 70  | 90  |
| 1 | 67  | 54  | 39  | 29  |
| 2 | 64  | 58  | 90  | 134 |
| 3 | 380 | 447 | 134 | 171 |

The variance value for the global histogram has a value of 20.9 AU. As can be seen by comparing image segments 2,1 and 1,3, the variances of the local histograms vary widely, ranging in number from 29 (local histogram) to 447.

Next, the global and local histogram variance values are compared, looking for the best equalized histograms, which is defined by the smallest variance value. In order to do this, the global variance value multiplied by a constant $\alpha$ is compared to the local histogram values. The constant $\alpha$ is selected to equalize the two variance values. If the global histogram value is, throughout the image, flatter than the local histogram value, the global histogram is designated the "relevant" histogram and is used in further processing. Alternatively, if one or more local variance values are smaller than:

$$V_L \leq V_G \times T_v$$

where
$V_L$ is the local variance;
$V_G$ is the global variance;
$T_v$ is the variance threshold.
then local histograms will be used to form the relevant histogram and used in subsequent processing. In the example given in FIG. 10, the constant multiplier to variance threshold was chosen to be "2" which has been found to give good results for general images, resulting in a global variance number for comparison of approximately 42 AU (2×20.9). In FIG. 9, all local histograms with a local variance number smaller than 42 AU are marked as relevant local histograms. As can be seen by comparing FIGS. 10 and 4, large pieces of the background (local histograms (0,0), (0,1), etc.) are considered not relevant for the image. A weighted sum of the relevant local histograms is used to derive the global relevant histogram shown in FIG. 10. In this case a uniform weighting of all relevant local histograms was used for simplicity.

It should be noted that the multiplier '2' was just one form of implementing the distinction between relevant and non-relevant local histograms. Another method is to select a fixed number of local histograms having the lowest variances. Yet another method is to use a weighted sum of all local histograms where the weighting factor decreases with increasing variance. In yet another method, the local histograms are only considered relevant if at least a predetermined number T of local histograms are designated relevant local histograms or any combination of the methods.

It can be seen from this table that the information as selected by the described process is located in the sky. Although this is correct for the particular image, the combination of relevant histograms for the regions selected in FIG. 10 do not accurately reflect the dynamic range of the image as a whole. This process will not operate well in areas of the image where the dynamic range is small.

In accordance with the invention, the selected regions can be validated to assure that they represent the full dynamic range of the image, by using other information from the shared context. It is necessary to compare the newly created histogram to the measurements made in the exposure analyzer (see, for example, U.S. Pat. No. 5,414,538 to Eschbach). Additional local histogram regions must be added to the contrast analysis, if it is determined that the selected local histograms do not represent the full dynamic range of the image.

A more appropriate method, therefore, for selecting the relevant histogram would be to include local histograms reflecting areas where the black and white points of the image are located. By black point and white point, we refer respectively to the actual darkest and/or lightest measured points within the image, or to values which can be defined as the darkest/lightest points. Although we use the former definition, the latter definition allows the ability to adjust these parameters if more is known about either the specific image or how the image was digitized.

In the example image, the black point and white point are located in the regions (0,3) and (3,0) with local variance value measurements of 90 and 380, respectively. Note that the selection of local histograms initially did not include these regions. FIG. 12 shows the histogram values using the modified region selection where the highlighted regions of FIG. 11 become the relevant histogram. To be compatible with the preselected regions, the histogram of the new regions must also be weighted.

Processing the image with the inclusion of the black point and white point within the local regions provides a better representation of the dynamic range of the image. The enhanced relevant histogram may also be used in the shared context for further consistency checks.

The process continues, by filtering the relevant histogram to obtain a final modified histogram which will then be used as the input of a standard histogram equalization routine. In this way, it is possible to achieve the desired effect of maintaining the histogram characteristics while simultaneously maintaining the simplicity of the standard histogram equalization processing.

Accordingly, the histogram curve can be flattened by operating on it with a function of $$H(i)^\beta$$

where $\beta$ is less than one. In empirical experience, it has been determined that $\beta$ can be one-fifth and produce desirable results. Alternatively, $\beta$ can be under user control, i.e., the user looks at the image and varies $\beta$ until a satisfactory result is obtained. Alternatively it may be possible to determine $\beta$ from the image, or by a predetermined function.

In general, most decreasing, non-linear functions of the original histogram could serve as filter operations on the relevant histogram. The main attribute of the filter function is to reduce the variation of the histogram and resulting in a final modified histogram that has a more flat or even distribution than the original image data. This can be seen by comparing the original histogram of FIG. 3 with the final modified histogram of FIG. 15. It is clear that the histogram depicted in FIG. 12 has lower variations than the one depicted in FIG. 3. Flattening of this modified histogram of FIG. 12 can be achieved using a standard histogram equalization routine to calculate the tone-reproduction curve or TRC for image enhancement. The TRC derived from the histogram of FIG. 12 is shown in FIG. 13. The TRC curve is a function which describes the relationship of the input to the output within a system for the purposes of image enhancement. This function is then applied to the full input image. The TRC given in FIG. 13 would transform an image with the histogram of FIG. 12 into an image having a flat or equalized histogram. In the present invention, however, the derived TRC is not used to operate on the image corresponding to FIG. 12, but rather is used to operate on the image corresponding to FIG. 3. FIG. 15 shows the histogram of the result of modifying the original input image using the TRC given in FIG. 13. A comparison of FIG. 15 (with black point, white point analysis) to the histogram of FIG. 14 (without black point, white point analysis) shows that detail in the darker regions of the image can be maintained. In this particular case, use of the white point had little effect.

The use of functions like the third, $\beta$=0.33, fourth, $\beta$=0.25 and fifth, $\beta$=0.2 order roots has shown good performance for image contrast enhancement. In general it can be said that the function used to filter the histogram can be implemented easily as a root function where $\beta$=0 flattens the final modified histogram and the resultant TRC therefore performs no operation on the data, i.e. no contrast enhancement, and $\beta$=1 performs no operation on the final histogram so that the resultant TRC equalizes the image histogram, i.e. a strong contrast enhancement.

The TRC function determined can be applied then to the luminance value of the images defined in luminance/chrominance space, which produces acceptable results. Additionally, however, the same TRC curve can be applied to each of the red, green and blue image components of the image as originally defined. This appears to produce somewhat better results.

Reviewing the process now in terms of a flow chart shown in FIG. 16, at step 400, r,g,b (red green blue) data is received from a source of input data. At step 402, the data is optionally sampled at low resolution; at step 404, the RGB data is converted to $YC_1C_2$ data. Step 404 begins a branching for parallel processing of the global histogram and several local histograms. At step 406, the global histogram for the image is derived, and at step 407, variance $V_G$ is calculated for the global histogram, while at steps 410, 412 and 414, the image is divided into N areas, a local histogram for each area is derived, and variance $V_n$ is calculated for each local histogram. At step 420, 422, 424 each local variance is compared to the global variance adjusted by the multiplier $\alpha$, and if less than the adjusted global variance, histogram n is marked. The process continues until each of N areas is processed. At step 426, the marked histograms are reviewed to make sure that at least T local histograms are marked. If not, at step 428, the global histogram will be called called for further processing. Then, at step 429, a subroutine is entered to check for the local histograms against the context of other processing.

In accordance with the invention, and with reference to FIG. 17, at step 500, information related to the black point and white point of the image is obtained. While it is assumed that this will be obtained from an exposure control portion of image processing, it could also be independently derived exclusively for this process. At step 502, the local histograms reflecting the regions in which the black point and white point are obtained for each, respectively. Then, each is tested to determine whether it has been selected for the contrast adjustment already, at steps 504 and 508, respectively. If not, the local histograms are positively selected at steps 506, and the selections are returned to the list of selected local histogram list for further processing at step 512.

If at least T histograms are marked, then at step 430 a weighted sum of the marked local histograms is formed to generate a relevant histogram. The histogram weakening function is applied to the histogram at step 432, and from the resulting final histogram function, a new TRC mapping is calculated at step 434, from which the contrast corrected image may be printed or displayed using the corrected TRC mapping at step 436.

In another embodiment, the variance multiplier $\alpha$ of step 420 in FIG. 15 is made a function of the global variance $V_g$. For low global variances the simple multiplier as given in step 420 is used. Here a value of $V_g<50=V_{low}$ has been found to be a good indication of a low global variance. For moderate global variances the number of local histograms that have a variance less than $\alpha V_{low}$ is determined, and if that number is larger than at least a predetermined number T of local histograms, those histograms are designated as relevant histograms. If the determined number is less than T local histograms, all local histograms with a variance less than $\alpha V_{moderate}$ are considered relevant. In this case, the histogram weakening function in step 432 is increased, i.e.: a stronger weakening is performed. Here a value of $50 \leq V_g < 100 = V_{moderate}$ has been found to be a good indication of a moderate global variance. For high global variances, $V_g > V_{moderate}$ and the relevant local histogram decision is incremented to cover the case where less than T local histograms have a variance less than $\alpha V_{moderate}$. In this case, the histogram weakening is further increased. It has been found that a histogram weakening parameter of $\beta$=0.2 works well on images that have a sufficient number of relevant local histograms less than $\alpha V_{low}$; that a parameter of $\beta$=0.1 works well on images that have a sufficient number of relevant local histograms less than $\alpha V_{moderate}$, but not $V_{low}$; and that $\beta=0.0$ works well on the rest of the images. The variation in values of $\beta$ indicates decreasing confidence in the efficacy of histogram flattening, and accordingly a weakening of the histogram flattening function with increasing variance. At some point, with exceptional large variances, flattening is turned off ($\beta=0.0$).

It will no doubt be appreciated that the present invention can be accomplished through application software accomplishing the functions described, to operate a digital computer or microprocessor, though a hardware circuit, which will probably provide optimum speed, or though some combination of software and hardware.

It will no doubt be appreciated that the case of $\beta=0.0$ can be augmented by allowing a simple image dynamic range stretching for the cases.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of improving the contrast in a natural scene image recorded as a set of electronic signals, including the steps of:

assuring that at least one component of the original electronic signal forming the natural scene image is defined with a signal describing intensity of the image;

from the intensity component of the electronic signals, deriving a set of local histograms signals, each describing the population of signals at possible intensity levels within the image for a region of the image;

selecting a subset of the local histogram signals as representing a maximum dynamic range of the natural scene image;

determining locations, by region, of the black point and white point within the electronic signals of the image;

assuring that the histograms representing regions in which the black point and white point occur are members of the subset of local histogram signals, and if not, adding them thereto;

combining the subset of local histograms with a selected weighting function to generate a relevant histogram;

operating on the relevant histogram signal with a filter that has the characteristics of reducing strong peaks and valleys in the signal;

using the filtered histogram signal, deriving a tonal mapping of input signals to output driver signals;

for each electronic signal forming the natural scene image, mapping the electronic signal to an output driver signal, using the tonal mapping derived.

2. The method as defined in claim 1, wherein each original electronic signal is defined in terms of red-green-blue color space.

3. The method as defined in claim 2, wherein each original electronic signal is defined in terms of red-green-blue color space is converted to luminance-chrominance space, and the signal describing intensity of the image is the luminance signal.

4. The method as defined in claim 1, wherein the step of deriving a tonal mapping of input signals to output driver signals includes the step of using a standard histogram equalization algorithm on the filtered histogram.

5. The method as defined in claim 1, including the initial step of sampling the electronic signals at a resolution less than the resolution of the electronic signals.

6. The method as defined in claim 1, wherein the step of operating on the histogram signal with a filter that has the characteristics of reducing strong peaks and valleys in the function, can be characterized by the function $$H'(i)=[H(i)]^{1/N}$$

where

H(i) is the histogram function for each image signal i, and

N is a value greater than 2.

7. A method of improving the contrast in a natural scene image recorded as a set of electronic signals, including the steps of:

receiving a set of color image-describing electronic signals from a source of natural scene images;

converting the received color image describing signals into a signal representing overall intensity of the image;

from the intensity signal, generating a global histogram signal, describing the population of intensity signals at possible intensity levels;

comparing the global histogram signal to a reference-flat signal and deriving a global variance from the comparison, representing the flatness of the histogram signal;

from the intensity signals, dividing the image into a plurality of discrete areas;

for each discrete area of the image, generating a local histogram signal, describing the population of intensity signals at possible intensity levels therewithin;

comparing each local histogram to a reference-flat signal, and deriving a local variance from the comparison, representing the flatness of the local histogram;

comparing each local variance to the global variance;

if any local variances are less than the global variance, summing a subset of local histogram signals having a variance less than the global variance value and obtaining a relevant histogram signal;

determining locations, by region, of the black point and white point within the electronic signals of the image;

assuring that the histograms representing regions in which the black point and white point occur are members of the subset of local histogram signals, and if not, adding them thereto;

combining the subset of local histograms with a selected weighting function to generate a relevant histogram;

filtering the relevant histogram signal or the global histogram signal if no local variance was less than the global variance;

using the filtered histogram signal, deriving a tonal mapping of input signals to printer driver signals;

for each electronic signal forming the natural scene image mapping the electronic signal to an output driver signal, using the tonal mapping derived.

8. The method as defined in claim 7, wherein the step of operating on the histogram signal with a filter that has the characteristics of reducing strong peaks and valleys in the function, can be characterized by the function $$H'(i)=[H(i)]^{1/N}$$

where

H(i) is the histogram function for each image signal i, and

N is a value greater than 2.

9. The method as defined in claim 7, including the step of sampling the red, green and blue electronic image signals at a resolution less than the resolution of the electronic image signals prior to converting the received red, green and blue image describing signals into signals representing overall intensity of the image.

10. The method as defined in claim 7, wherein the global histogram is used as the relevant histogram if not at least a preset number of local histograms have a variance value smaller than the global variance value.

11. The method as defined in claim 7, wherein the global variance is adjusted using a multiplicative adjustor, giving a new global variance to be used in the comparison with the local variances.

12. The method as defined in claim 7, wherein the multiplicative adjustor, is varied as a function of the global variance.

13. A method of improving contrast in a natural scene image represented by electronic signals including the steps:

a) developing a histogram representing critical areas of the image, where the critical areas include
   i) areas having represented therein a significant portion of the dynamic range of the image, and
   ii) areas in which the black point of the image and the white point of the image occur;

b) filtering the histogram with a filter to reduce strong peaks and valleys in the image;

c) developing a tone reproduction curve for the image mapping input signals to output signals based on the filtered histogram;

d) reproducing the image using the tone reproduction curve developed.

* * * * *